INVENTORS
JOHN C. ABROMAVAGE
JAMES W. RYDEN

BY Semmes and Semmes
ATTORNEYS

May 26, 1970  J. C. ABROMAVAGE ET AL  3,514,067
REAR VIEW MIRROR ADJUSTABLE SUPPORT
Filed July 11, 1968  4 Sheets-Sheet 2

INVENTORS
JOHN C. ABROMAVAGE
JAMES W. RYDEN
By Semmes and Semmes
ATTORNEYS

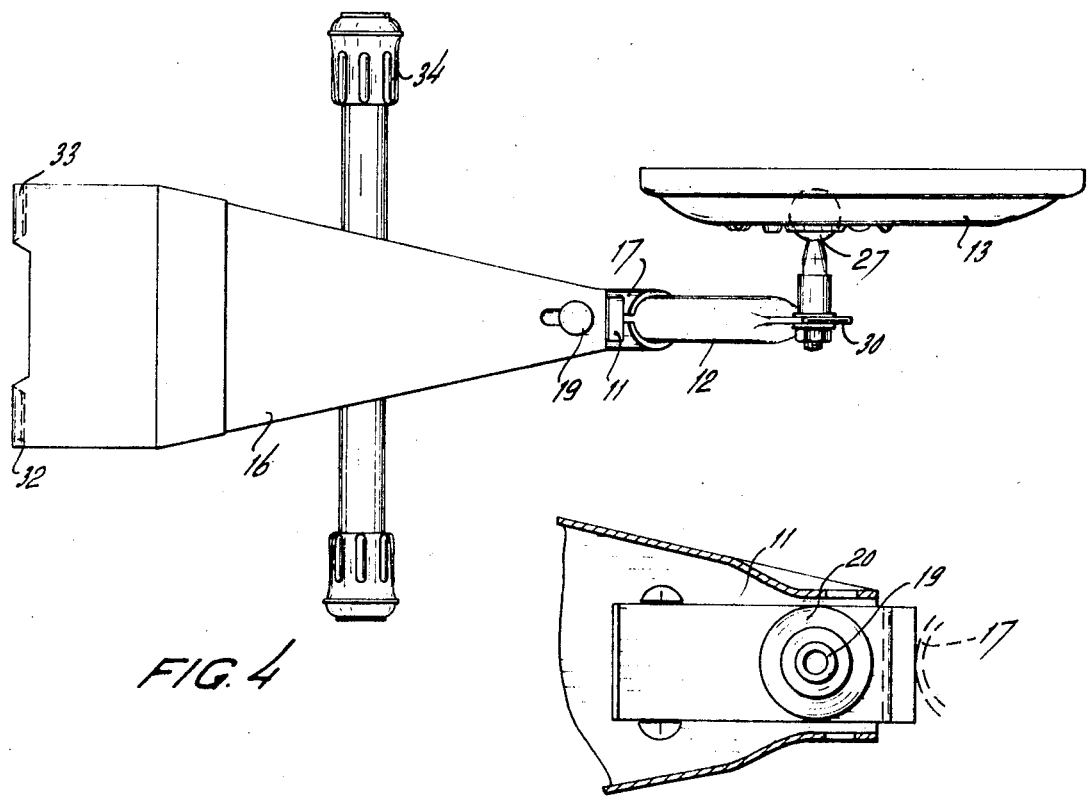

INVENTORS
JOHN C. ABROMAVAGE
JAMES W. RYDEN

BY Semmes and Semmes
ATTORNEYS

United States Patent Office 3,514,067
Patented May 26, 1970

3,514,067
REAR VIEW MIRROR ADJUSTABLE SUPPORT
John C. Abromavage, Tempe, and James W. Ryden, Phoenix, Ariz., assignors to Arcoa, Incorporated, Phoenix, Ariz., a corporation of Oregon
Filed July 11, 1968, Ser. No. 744,199
Int. Cl. A47g 1/24
U.S. Cl. 248—484          8 Claims

ABSTRACT OF THE DISCLOSURE

A rear-view mirror of the type used in the trailer-rental industry for temporary installation on the renter's automobile door, including a base having a pivoted auto-window clamp and a door-bottom clamp. This structure is distinguished from the prior art in providing means for varying the angle of the base and rear-view mirror with respect to the auto door means, varying the length of the bottom door clamp, as well as a mirror support which is pivotable 180° upon the base, enabling positioning of the assembly on the left or right-hand auto doors.

CROSS-REFERENCES TO RELATED APPLICATIONS

Rear View Mirror Support (Pat. No. 3,186,672), assigned to assignee herein;
Adjustable Mirror (Ser. No. 640,702), filed May 23, 1967 and assigned to assignee herein (being examined in Group 351).

BACKGROUND OF THE INVENTION (1) The invention

In the trailer industry a great deal of attention has been given to developing a rear view mirror which could be placed upon the towing vehicle's right or left hand side, while pulling the rented trailer. The desired object of such adjustable mirrors has been to enable their mounting on any type of auto door by an inexperienced operator. A shortcoming of conventional adjustable mirrors has been the relative difficulty of switching the mirror from left hand to right hand auto door use, and adjusting the angle of mirror support with respect to various types of auto doors.

(2) Description of the prior art

The most pertinent prior art consists in the following inventions assigned to assignee herein:
Weder 3,186,672 provides an adjustable mirror support embodying a base supporting a rear view mirror and a top auto window clamp pivoted to the base and an extensible bottom door clamp extensively depending from the bottom of the base. However, Weder 3,186,672 did not have the capability of varying the angle of the base and mirror with respect to the door and Weder did have the capability of converting the mirror from left hand to right hand door use.
Assignee's pending application Ser. No. 640,702 discloses an improvement in the form of an adjustable dog leg extension from the base and abutting the car door for regulation of the height of the mirror with respect to the auto window. Here again, the angle of the base and mirror with respect to the auto window cannot be adjusted and there is no ready provision for change from right to left hand auto door use, the mirror being required to be removed from the base and converted by extensive change of dog leg and window clamp elements.

SUMMARY OF THE INVENTION

According to the present invention, the angle of the base and rear view mirror with respect to the auto door is readily adjusted and the device is between readily interchangeable left hand and right hand auto doors use.
The angle of the base and rear view mirror with respect to the door is varied by an angle adjust locking piece extending from the top auto window clamp to the base. Conversion of the assembly from left hand to right hand door use is accomplished by 180° pivoting of auto window clamp upon a pivot collar encircling and lockable upon the base. The bottom auto door clamp extensibly depends from the point of pivot of top auto window clamp and collar and is longitudinally adjustable so as to accommodate doors of various height.

BRIEF DESCRIPTION OF THE DRAWINGS

FIG. 4 is a top plan of the FIGS. 1 and 2 device;
FIG. 5 is an enlarged cross-section thereof along line 5—5 of FIG. 2;
FIG. 6 is an enlarged transverse sectional view taken on line 6—6 of FIG. 2.

DESCRIPTION OF THE PREFERRED EMBODIMENTS

Figure 1:
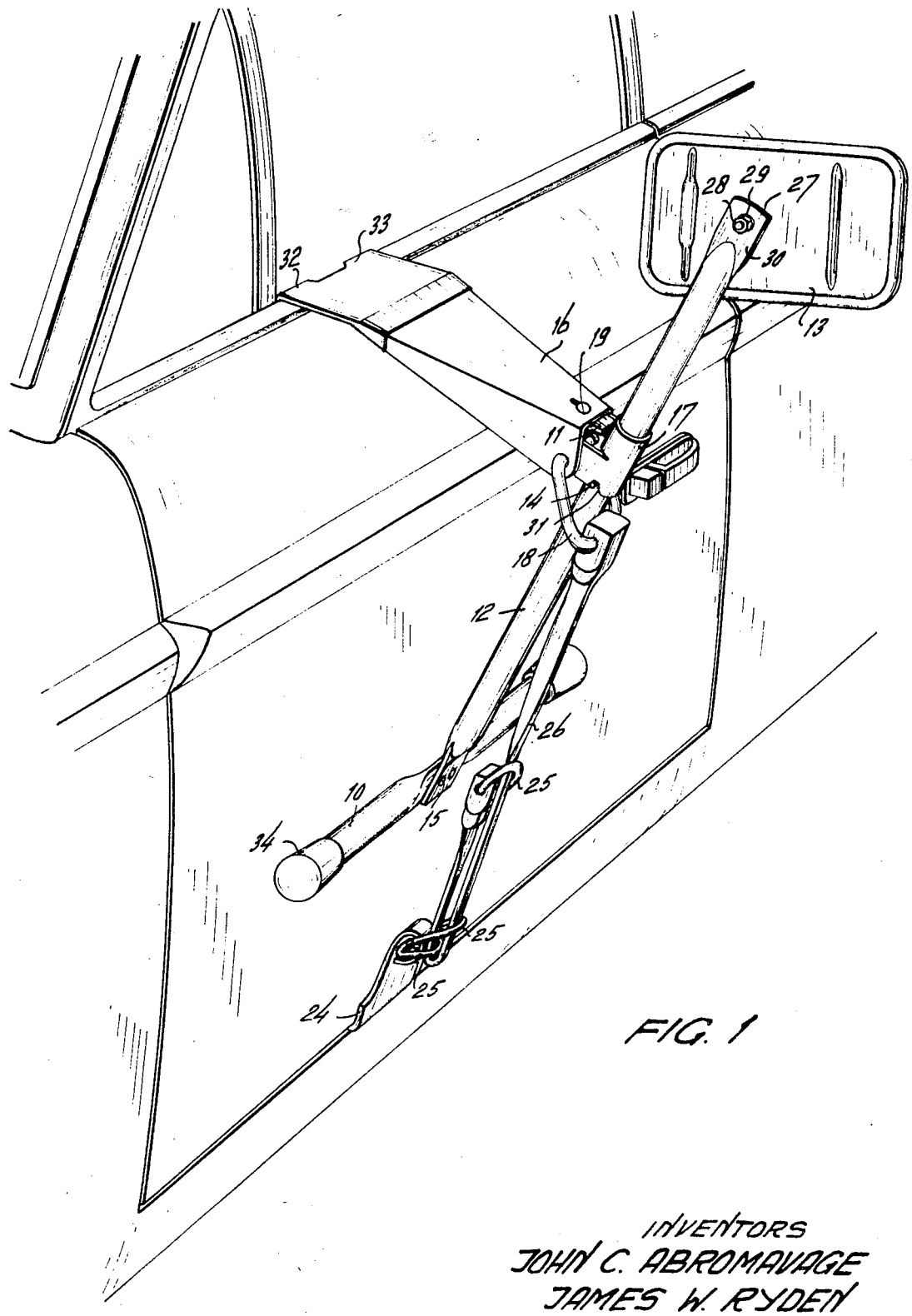
FIG. 1 is a perspective view of the rear view mirror attached to the door of a motor vehicle.
Figure 3:
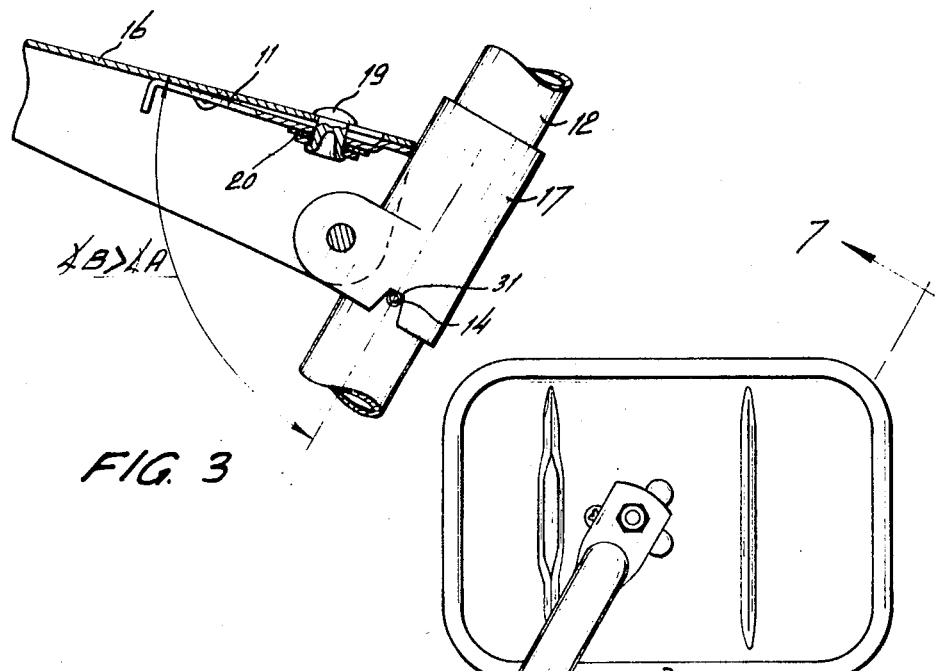
FIG. 3 is an enlarged fragmentary side elevation and cross section of the FIG. 2 rear view mirror with locking piece in retracted position.
Figure 2:
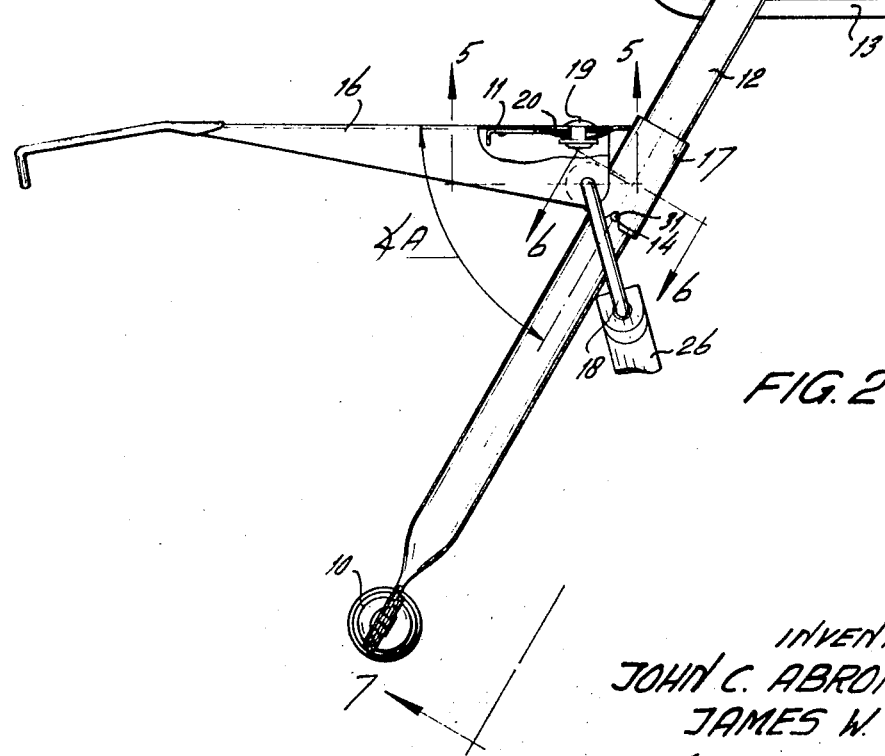
FIG. 2 is a side elevation and cross section of the rear view mirror with its locking piece in an extended position.
Figure 7:
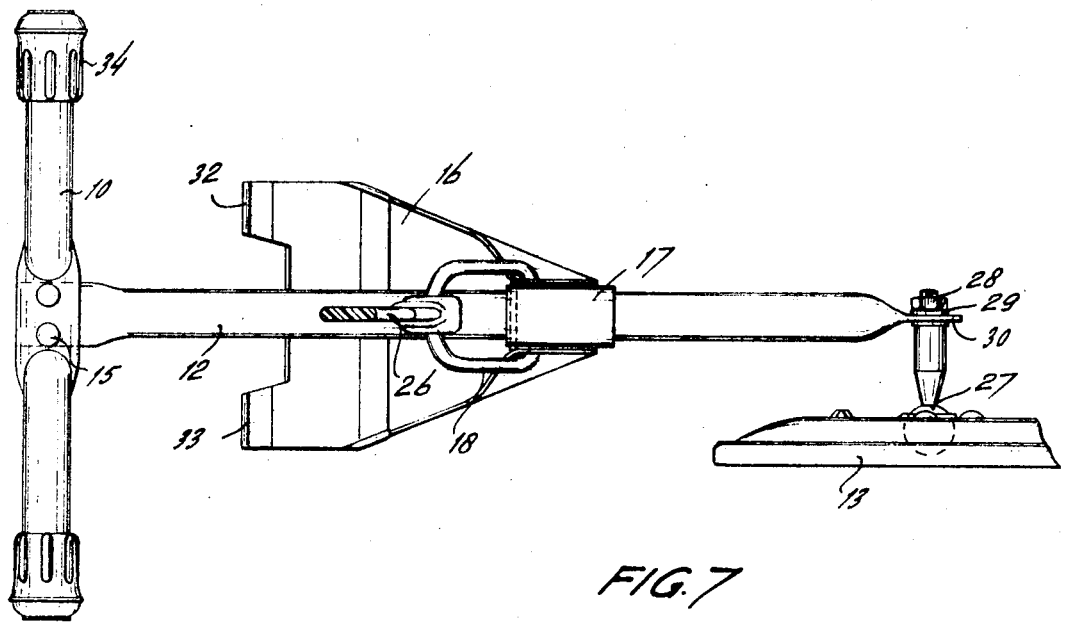
FIG. 7 is a bottom plan thereof, partially fragmentary.
Figure 8:
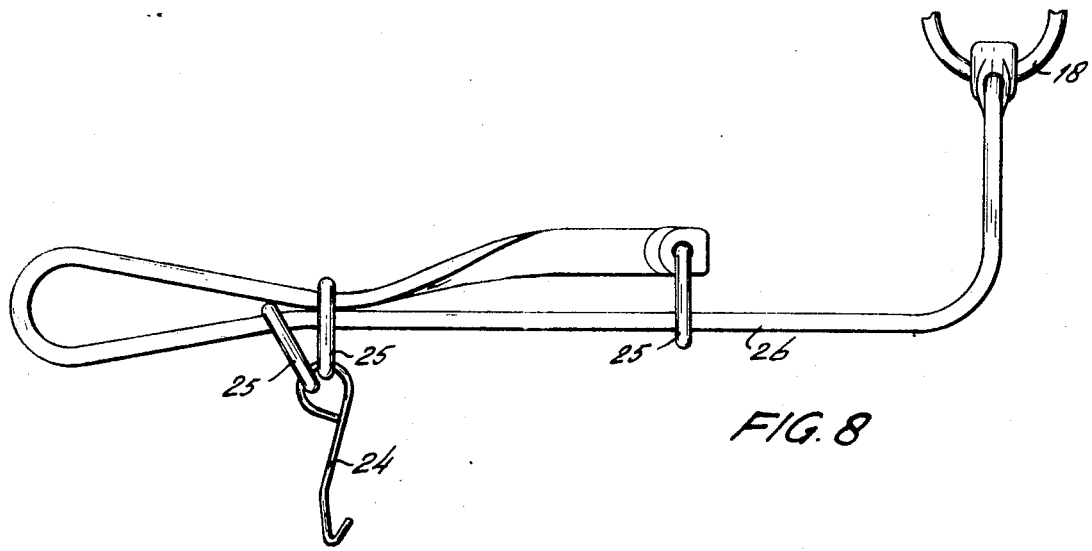
FIG. 8 is a side elevation of the extensible bottom door clamp.

In FIG. 1 rear view mirror 13 is indicated as supported upon ball joint 27 secured in mirror support base 12, flange 30 by means of nut 28 and locking washer 29. Support base 12 includes laterally extending bottom bumper or foot brace 10 having rubber caps 34 at its extremities and secured to base 12 by means of rivets 15.
Top auto window clamp 16 is pivoted to pivot collar 17 encircling base 12 and secured in attitudes of 180° pivots by means of roll pin 14 extending through the base 12 and engaging opposed complementary recesses 31 in the pivot collar 17. Top auto window clamp 16 may be plasticized at its bifurcated ends 32 and 33 so as to protect the auto finish.
Bottom auto door clamp includes an extensible strap 26 longitudinally adjustable by D rings 25 and having bottom hook 24 which may be plasticized and serves for engaging the bottom of the auto door. Strap 26 is secured to the point of pivot of auto window clamp 16 and pivot collar 17 by means of tension ring 18.
Locking piece latch 11 is extensibly supported beneath auto window channel clamp 16 and is locked in various attitudes of extension by means of thumb button 19 secured upon clamp 16 by means of cup washer spring 20.
As illustrated in FIGS. 2 and 3, the angle of pivot of auto window clamp 16 is varied by extending and retracting latch 11 and, thus, the angle of the base and rear view mirror with respect to the door can be pre-set.
As will be apparent, pivot collar 17 will swivel completely 360°; however, by swiveling 180° adjustment from left to right hand auto door use is facilitated. When the adjustable strap 26 is in place, the pivot collar 17 is held securely over the locking pin 14. Also, top auto window clamp 16 is adjusted by depressing thumb button 19 and sliding forward latch 11 which changes the angle of the support arm or base 12, so that rear view mirror 13 will fit at any angle on the right side of the vehicle and the driver will have a very good view in adjustment of the mirror head. When the rear view mirror 13 is on the left hand side of the vehicle, latch 11 is retracted for similar adjustment of auto window clamp 16 to insure proper support and vision through the left auto window.

Manifestly, various changes in locking angle adjustment and pivoting may be employed without departing from the spirit and scope of invention.

We claim:
1. A rear-view mirror comprising:
   (A) a supporting base having bumper means at its lower end;
   (B) a rear-view mirror adjustably supported in the upper end of said supporting base;
   (C) a top auto window channel clamp pivoted at one end medially of said base and extending to one side thereof;
   (D) a bottom auto door clamp flexibly depending from said auto window channel clamp and including an extensible member, and
   (E) a pivot collar positioned about said base and pivotally supporting said auto window channel clamp, said pivot collar being pivotable about said base and including lock means mounted in said base and engaging said collar in several attitudes of pivot about said base.

2. A rear view mirror as in claim 1, said top auto window clamp including:
   (F) an angle adjust locking piece interposed between said base and said clamp, so as to limit the angle of pivotability of said clamp with respect to said base.

3. A rear view mirror as in claim 2, said angle adjust locking piece being supported beneath said auto window door clamp and extensible therefrom towards said base.

4. A rear view mirror as in claim 3, said angle adjust locking piece including a thumb button locking means extending through the top of said clamp and intersecting said locking piece in various attitudes of extension.

5. A rear view mirror as in claim 4, said supporting base having laterally extending bumper means at its lower end, and said top auto window channel clamp being bifurcated, so as to laterally distribute clamping forces.

6. A rear view mirror as in claim 1, said extensible member being secured to said top auto window channel clamp and said pivot collar at the point of pivot of clamp and collar.

7. A rear view mirror as in claim 6, said pivot collar lock means including:
   (G) a locking pin extending through said base and engaging a complementary recess in said collar, so as to lock said collar in various attitudes of pivot about said base.

8. A rear view mirror as in claim 7, said thumb button locking means including a resilient member interposed between the thumb button and clamp.

References Cited

UNITED STATES PATENTS

| | | | |
|---|---|---|---|
| 3,142,469 | 7/1964 | Clemmer | 248—226 |
| 3,168,277 | 2/1965 | Stewart | 248—226 X |
| 3,228,643 | 1/1966 | Shilling | 248—226 |
| 3,260,490 | 7/1966 | Trautner | 248—226 |

ROY D. FRAZIER, Primary Examiner

F. DOMOTOR, Assistant Examiner

U.S. Cl. X.R.

248—226